United States Patent
Ahluwalia

(10) Patent No.: US 6,370,506 B1
(45) Date of Patent: Apr. 9, 2002

(54) COMMUNICATION DEVICES, METHODS, AND COMPUTER PROGRAM PRODUCTS FOR TRANSMITTING INFORMATION USING VOICE ACTIVATED SIGNALING TO PERFORM IN-CALL FUNCTIONS

(75) Inventor: Inderpreet Singh Ahluwalia, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/411,964

(22) Filed: Oct. 4, 1999

(51) Int. Cl.⁷ .............................................. G10L 15/00
(52) U.S. Cl. .................................... 704/275; 379/88.01
(58) Field of Search ................................ 704/275, 270; 379/88.01, 88.02, 88.03, 220

(56) References Cited

U.S. PATENT DOCUMENTS 4,827,500 A * 5/1989 Binkerd et al. .......... 379/88.01
5,950,167 A * 9/1999 Yaker ......................... 704/275

FOREIGN PATENT DOCUMENTS

EP 0 892 534 A2 1/1999
EP 0 893 901 A2 1/1999
GB 2 335 826 A 9/1999

OTHER PUBLICATIONS

International Search Report, PCT/US00/22938, Jan. 24, 2001.

* cited by examiner

Primary Examiner—David D. Knepper
(74) Attorney, Agent, or Firm—Myers Bigel Sibley & Sajovec

(57) ABSTRACT

Communication devices, methods, and computer program products may be used to transmit information to a destination by associating a voice command with the destination and associating a signaling message with the voice command and with the destination. After establishing communication with the destination, speech input that is received from a user is compared with the voice command to determine if there is a match. If the speech input matches the voice command, then the signaling message associated with the voice command is transmitted to the destination. A user may therefore be relieved of the burden of having to remember the keystrokes to perform a specific operation or function by embedding the signal(s) corresponding to the operation in the signaling message. Moreover, because the signaling message is associated with both the voice command and the destination, the same voice command may be used to perform an operation on more than one destination. For example, a user may have multiple bank accounts such that when a first bank is called, speaking the command "balance" results in a first signaling message (e.g., a specific key sequence) being transmitted to the first bank's automated account information system. Likewise, when a second bank is called, speaking the command "balance" results in a second signaling message, different from the first signaling message, being transmitted to the second bank's automated account information system.

64 Claims, 7 Drawing Sheets

| 1 Balance | | | |
|---|---|---|---|
| | 1 Current | | |
| 2 Withdrawals | | | |
| | 1 Last Five | | |
| | 2 By Type | | |
| | | 1 Checks | |
| | | 2 ATM | |
| | | 3 Automatic | |
| | | * Ret. to Main | |
| | 3 More | | |
| | * Ret. to Main | | |
| 3 Deposits | | | |
| | 1 Last Five | | |
| | 2 By Type | | |
| | | 1 Checks | |
| | | 2 ATM | |
| | | 3 Direct Dep. | |
| | | * Ret. to Main | |
| | 3 More | | |
| | * Ret. to Main | | |
| 0 Operator | | | |

FIG. 1
*(PRIOR ART)*

COMMUNICATION DEVICES, METHODS, AND COMPUTER PROGRAM PRODUCTS FOR TRANSMITTING INFORMATION USING VOICE ACTIVATED SIGNALING TO PERFORM IN-CALL FUNCTIONS

FIELD OF THE INVENTION

The present invention relates generally to the field of telephony, and, more particularly, to the use of voice recognition technology to facilitate in-call signaling during a communication session.

BACKGROUND OF THE INVENTION

Speech or voice recognition (VR) technology, which has been used in such computer applications as word processing, may also be used in telephony devices and systems. A communication terminal (e.g., mobile/wireless phone, wireline phone, etc.) may include a feature that provides for certain voice-activated commands (VACs) to perform call origination and termination functionality. For example, a user may speak the command "call John," which is then processed by the VR hardware and/or software in the communication terminal and translated into an instruction to dial a phone number associated with the label "John." Similarly, a user may speak the command "hang up," which, after processing by the VR hardware and/or software, is translated into an instruction to disconnect from the current communication session (e.g., assert an on-hook signal).

In addition to the signals transmitted during call origination (e.g., destination phone number) and call termination (e.g., on-hook signal), a user may also wish to transmit signals to a destination while the call or communication session is in a stable "talking" state. A common example in which such in-call signaling is commonly used is communication with an automated response system, such as a voice mail system, call routing system, financial account information system, etc. FIG. 1 illustrates a conventional, hierarchical menu that may be used in a bank's automated account information system. As shown in FIG. 1, upon dialing the bank's phone number to reach the automated account information system, a user may press the "1," "2," or "3" key to check their balance, withdrawals, or deposits, respectively. When a user presses a key, a dual tone multi-frequency (DTMF) signaling message is transmitted to the bank's automated account information system where it is interpreted and compared against a list of recognized requests based on the user's current position within the menu. If the automated account information system detects a match, then the requested function is performed.

Because of the hierarchical nature of the account functions menu of FIG. 1, a user may have to remember a sequence of keystrokes to perform some functions. Referring now to FIG. 1, to check all ATM withdrawals the user must press "2," "2," and "2." If the user then wishes to check all direct deposits, the user must press "*," "3," "2," and "3." These sequences may be difficult for a user to remember causing the user to rely upon automated voice prompts to recite the keystrokes for various options, which may be time consuming.

It may be desirable, therefore, to use VR technology to facilitate the transmission of predefined signals during a stable phone call or communication session. Unfortunately, the use of VR technology may be complicated in that a user may access several different automated response systems on which common functions are performed and the implementation of these functions may differ between the automated response systems. Consider, for example, a user's voice mail. A user may have one voice mail system that they use at their workplace, a second voice mail system that they use at home (e.g., an answering machine), and a third voice mail system associated with their mobile phone account. All three of these voice mail systems may include the management functions of saving a message, deleting a message, and skipping to the next message, which may be executed by pressing the correct key(s) on a phone's keypad. The specific keystrokes used to request each of these management functions may be different between the three voice mail systems. For example, pressing the "3" key on one of the voice mail systems may erase a message while it may save a message on another of the voice mail systems.

Consequently, there exists a need for improved use of VR technology in telephonic devices and systems that can facilitate in-call signaling and may alleviate the need for a user to remember lengthy keystroke sequences to perform a specific function on a destination, such as an automated response system. Moreover, there exists a need for improved use of VR technology in telephonic devices and systems that can allow a user to use a consistent set of spoken commands to perform similar functions across multiple automated response systems.

SUMMARY OF THE INVENTION

It is therefore an object of the present invention to provide improved communication devices, methods, and computer program products that can allow a user to perform in-call functions in response to voice activated commands.

It is another object of the present invention to provide improved communication devices, methods, and computer program products that can translate voice commands into telephonic signals that can be transmitted to a destination to perform desired operations.

These and other objects, advantages, and features of the present invention may be provided by communication devices, methods, and computer program products that may be used to transmit information to a destination by associating a voice command with the destination and associating a signaling message with the voice command and with the destination. After establishing communication with the destination, speech input that is received from a user is interpreted and compared with the voice command to determine if there is a match. If the speech input matches the voice command, then the signaling message associated with the voice command and with the destination is transmitted to the destination. The present invention may relieve the user of the burden of having to remember the keystrokes to perform a specific operation or function by embedding the signal(s) corresponding to the operation in the signaling message. Moreover, because the signaling message is associated with the voice command and the destination, the same voice command may be used to perform an operation on more than one destination. For example, a user may have multiple bank accounts such that when a first bank is called, speaking the command "balance" results in a first signaling message (e.g., a specific key sequence) being transmitted to the first bank's automated account information system. Likewise, when a second bank is called, speaking the command "balance" results in a second signaling message, different from the first signaling message, being transmitted to the second bank's automated account information system.

In accordance with an aspect of the invention, a plurality of voice commands can be associated with a destination with each voice command having a signaling message associated therewith.

In accordance with another aspect of the invention, a signaling message can be defined, which is transmitted to establish communication with the destination.

In accordance with still another aspect of the invention, the signaling messages associated with the voice commands and/or used to access the destination comprise at least one dual tone multi-frequency (DTMF) signal.

In accordance with yet another aspect of the invention, a voice command is associated with a destination by recording a voice command label.

The present invention, therefore, may allow a user to conveniently issue DTMF commands while a call is in progress. More specifically, in accordance with an exemplary embodiment, one or more user defined spoken command words are associated with signaling messages, each comprising a DTMF signal or sequence thereof, such that the signaling messages are context-sensitive with regard to the number or destination dialed. Advantageously, the present invention may allow a user to use a consistent set of spoken command words to communicate with a variety of different automated response systems.

BRIEF DESCRIPTION OF THE DRAWINGS

Other features of the present invention will be more readily understood from the following detailed description of specific embodiments thereof when read in conjunction with the accompanying drawings, in which:

FIG. 1 is a block diagram that illustrates a conventional, hierarchical menu that may be used to provide a banking customer with information about their account;

DETAILED DESCRIPTION OF PREFERRED EMBODIMENTS

Figure 2:
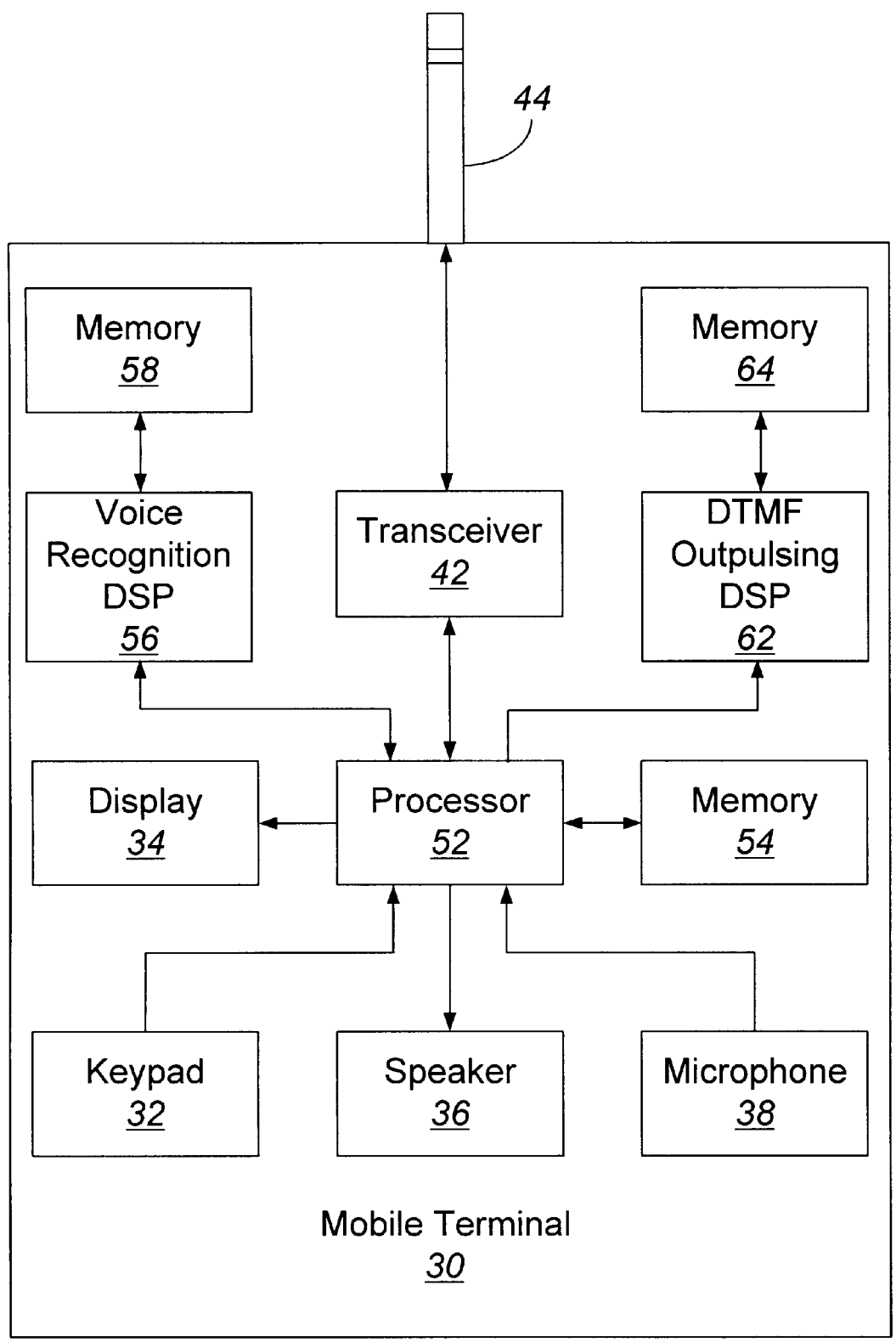
FIG. 2 is a high-level block diagram of an exemplary mobile terminal that illustrates communication devices, methods, and computer program products in accordance with the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

For purposes of illustration and in no way limited thereto, communication devices, methods, and computer program products in accordance with the present invention will be discussed hereafter as embodied in a mobile terminal. It should be understood, however, that the communication devices, methods, and computer program products of the present invention may be used in other types of telephony systems and devices.

The present invention may be embodied as a communication device, method, or computer program product. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable or computer-readable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 2, a mobile terminal 30 in accordance with the present invention typically includes a keypad 32, a display 34, a speaker 36, a microphone 38, a transceiver 42, and a memory 54 that communicate with a processor 52. The transceiver 42 receives incoming signals from and transmits outgoing signals to an antenna 44 and is used to establish and maintain communication with another party or destination. These components are included in many conventional mobile terminals and their functionality is generally known to those skilled in the art. The mobile terminal 30 further includes a voice recognition (VR) digital signal processor (DSP) 56 that communicates with both the processor 52 and a memory 58 and a dual tone multi-frequency (DTMF) outpulsing DSP 62 that communicates with both the processor 52 and a memory 64.

Figure 3:
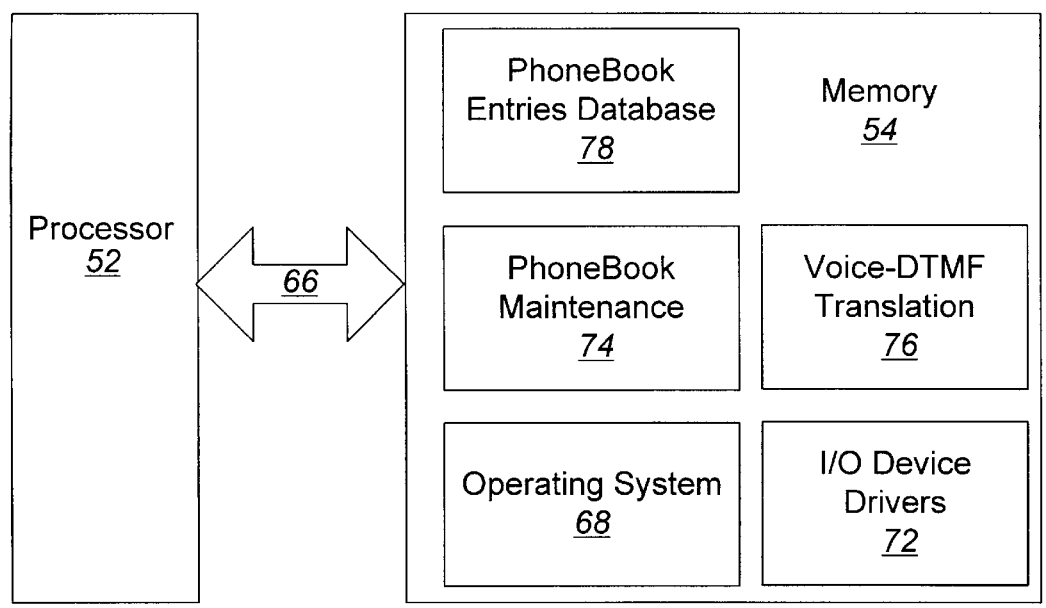
FIG. 3 is a block diagram that illustrates a processor and memory shown in FIG. 2 in greater detail.

FIG. 3 illustrates the processor 52 and memory 54 in more detail. The processor 52 communicates with the memory 54 via an address/data bus 66. The processor 52 can be any commercially available or custom microprocessor suitable for an embedded application. The memory 54 is representative of the overall hierarchy of memory devices containing the software and data used to implement the functionality of the multi-mode mobile terminal 30. The memory 54 may include, but is not limited to, the following types of devices: cache, ROM, PROM, EPROM, EEPROM, flash, SRAM, and DRAM.

As shown in FIG. 3, the memory 54 may hold five major categories of software and data used in the mobile terminal 30: the operating system 68; the input/output (I/O) device drivers 72; the PhoneBook maintenance module 74, the voice-DTMF translation module 76; and the PhoneBook entries database 78. The operating system 68 should be designed for real time embedded applications and, preferably, is relatively compact to make efficient use of the memory 54. The I/O device drivers 72 typically include software routines accessed through the operating system 68 to communicate with devices such as the keypad 32, display 34, speaker 36, microphone 38, and certain memory components. The PhoneBook maintenance module 74 comprises programs for creating and maintaining the PhoneBook entries database 78. Finally, the voice-DTMF translation module 76 cooperates with the PhoneBook entries database 78 to control the transmission of DTMF signals during a phone call or communication session in response to speech input from a user.

Figure 4:
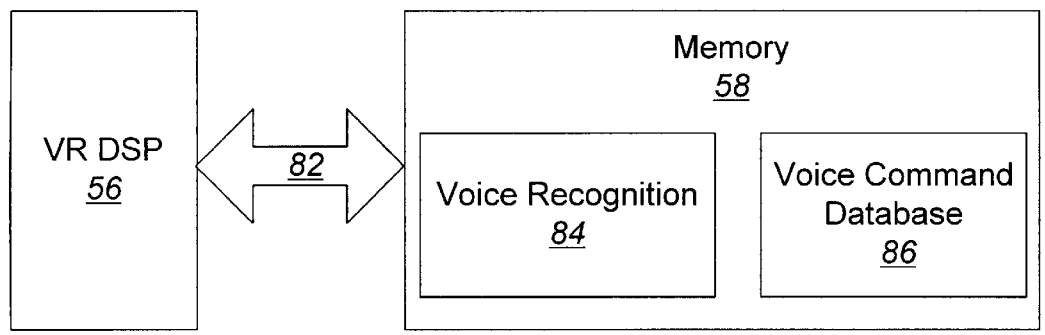
FIG. 4 is a block diagram that illustrates a voice recognition (VR) digital signal processor (DSP) and memory shown in FIG. 2 in greater detail.

FIG. 4 illustrates the VR DSP 56 and memory 58 in more detail. The VR DSP 56 communicates with the memory 58 via an address/data bus 82. The VR DSP 58 can be any commercially available or custom digital signal processor suitable for a voice recognition application. The memory 58 is representative of the overall hierarchy of memory devices containing the software and data used to implement the voice recognition functionality of the multi-mode mobile terminal 30. The memory 58 may include, but is not limited to, the following types of devices: cache, ROM, PROM, EPROM, EEPROM, flash, SRAM, and DRAM.

As shown in FIG. 4, the memory 58 may hold two major categories of software and data used to implement the voice recognition functionality in accordance with the present invention: the voice recognition module 84 and the voice command database 86. The voice recognition module 84 comprises programs for providing the mobile terminal 30 with a voice recognition capability, i.e., the ability to assign digital signatures to words spoken by a user. The voice command database 86 contains the digital signatures corresponding to the words "learned" by the voice recognition module 84.

Figure 5:
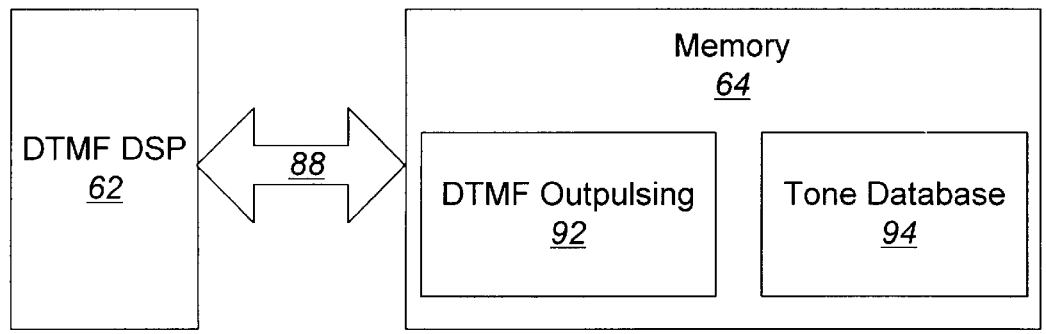
FIG. 5 is a block diagram that illustrates a dual tone multi-frequency (DTMF) outpulsing digital signal processor (DSP) and memory shown in FIG. 2 in greater detail.

FIG. 5 illustrates the DTMF DSP 62 and memory 64 in more detail. The DTMF DSP 62 communicates with the memory 64 via an address/data bus 88. The DTMF DSP 58 can be any commercially available or custom digital signal processor suitable for synthesizing the voice band frequencies recognized by the public switched telephone network (PSTN) as corresponding to the digits and symbols from a conventional phone keypad. Specifically, the PSTN is designed to recognize a unique frequency pair for each of the twelve buttons or digits on a telephone keypad. Each of the three columns of a phone keypad is assigned a frequency and each of the four rows of the phone keypad is assigned a frequency. Accordingly, the DTMF frequency pair for a specific digit or button is given by the combination of the frequencies assigned to the digit's or button's column and row. Referring to FIG. 5, the memory 64 is representative of the overall hierarchy of memory devices containing the software and data used to implement the DTMF outpulsing functionality of the multi-mode mobile terminal 30. The memory 64 may include, but is not limited to, the following types of devices: cache, ROM, PROM, EPROM, EEPROM, flash, SRAM, and DRAM.

As shown in FIG. 5, the memory 64 may hold two major categories of software and data used to implement the DTMF outpulsing functionality in accordance with the present invention: the DTMF outpulsing module 92 and the tone database 94. The DTMF outpulsing module 92 comprises programs for providing the mobile terminal 30 with the ability to outpulse or transmit DTMF signals. The voice command database 94 contains the data used by the DTMF outpulsing module 92 to synthesize and transmit the DTMF signals. These data may include the standard DTMF frequencies recognized by the PSTN as corresponding to the keys on a conventional phone keypad. In addition, the tone database 94 may include power levels for the DTMF signals as well as timing data to control the duration of each transmitted DTMF signal and the delay between consecutive transmissions of DTMF signals.

It should be understood that while the memories 54, 58, and 64 are shown as discrete units in FIGS. 2–5, the memories may be implemented as part of a single program and data storage management scheme. In this implementation, the divisions between the memories 54, 58, and 64 are virtual based on the address spaced assigned to the processor 52, VR DSP 56, and DTMF DSP 62. Moreover, in a preferred embodiment of the present invention two DSPs-a VR DSP 56 and a DTMF outpulsing DSP 62—are used to implement the voice recognition and DTMF outpulsing functionality. A single DSP may nevertheless be used to implement both the voice recognition and DTMF outpulsing functionality with the voice-DTMF translation module 76 controlling the operational mode of the DSP through the processor 52.

The present invention is described hereinafter with reference to flowchart illustrations of mobile terminals, methods, and computer program products according to an embodiment of the invention. It will be understood that each block of the flowchart illustrations, and combinations of blocks in the flowchart illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

With reference to the flowcharts of FIGS. 6A–6B and 7A–7B, exemplary operations for creating PhoneBook entries and using these entries to transmit a signaling message to a destination (e.g., an automated response system) during a stable call or communication session will be described.

Figure 6A:
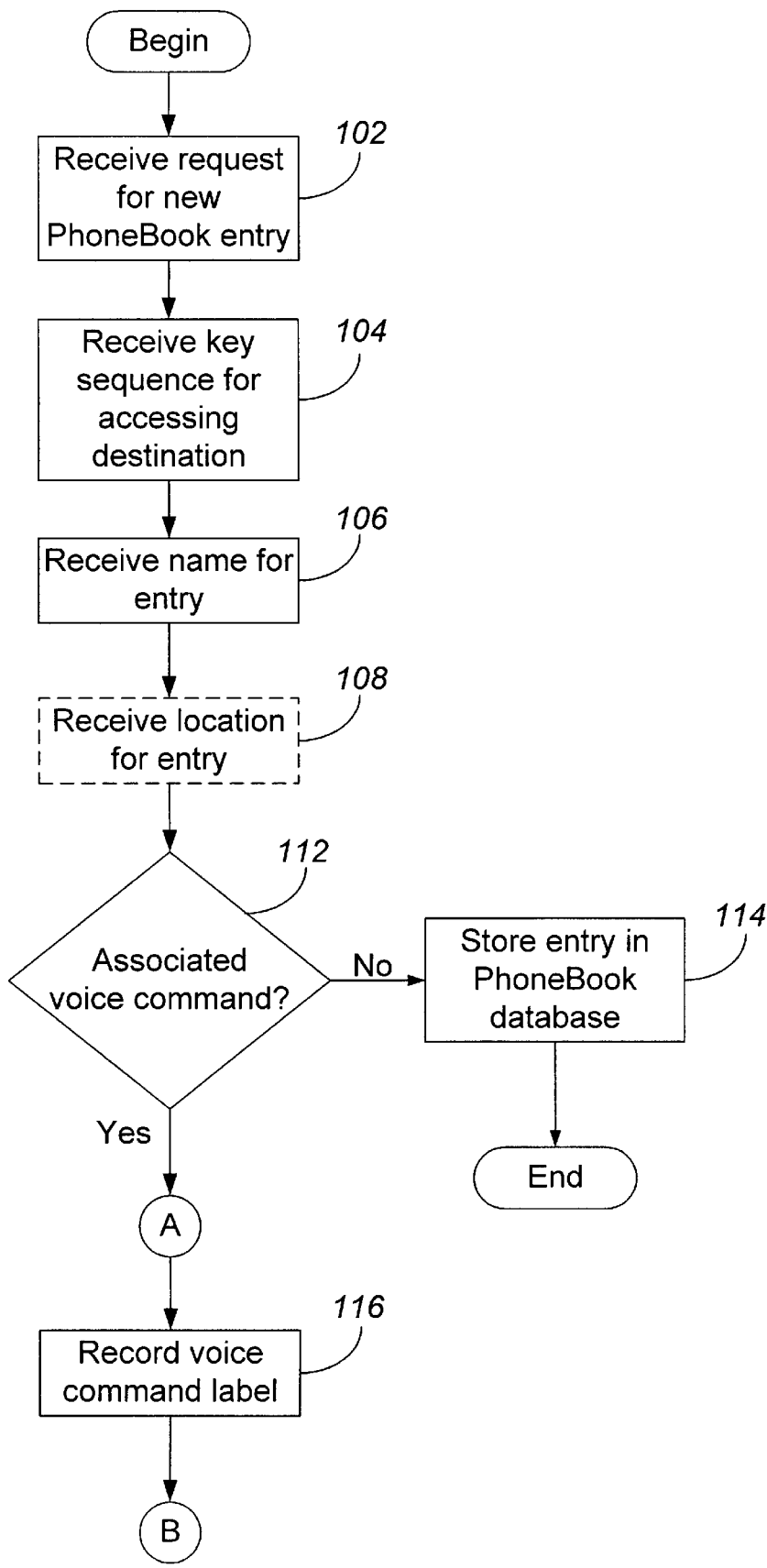
FIGS. 6A, 6B, 7A, and 7B are flow charts that illustrate operations of communication devices, methods, and computer program products of FIGS. 2–5 in accordance with the present invention.

Referring now to FIGS. 3, 4, and 6A, operations for creating a PhoneBook entry for storage in the PhoneBook entries database 78 begin at block 102 where a request is received from a user to create a new PhoneBook entry. The PhoneBook maintenance module 74 may use the display 34 of the mobile terminal 30 to provide a user interface (eg., prompts and icons) to assist a user in creating and maintaining PhoneBook entries.

Each PhoneBook entry preferably comprises the following structure:

PhoneBook Entry Structure
Location Sequence number assigned to entry
Name: Name assigned to entry
Number: Phone number of destination
Voice Command 1: Voice command associated with entry
Keystroke: Keystroke(s) associated with Voice Command 1
•
•
Voice Command n: Voice command associated with entry
Keystroke: Keystroke(s) associated with Voice Command n Preferably, the PhoneBook entries database 78 is configured as a relational database with each PhoneBook entry comprising a single tuple in the database. The Name field or the Number field may be used as keys for accessing and retrieving a tuple from the PhoneBook entries database 78. The content and use of the PhoneBook entry fields will be described in greater detail hereinafter.

Once the user has requested a new PhoneBook entry, the PhoneBook maintenance module 74 may prompt the user for information, which is used to populate the PhoneBook entry fields. At block 104, the user enters the key sequence (i.e., phone number) for accessing the destination, which is stored in the Number field. The key sequence for accessing the destination may be used as a key for accessing PhoneBook entry tuples in the PhoneBook entries database 78. Note that the key sequence need not be limited to the destinations phone number as it may be desirable to include a login, password, personal identification number (PIN), or other type of code as part of this sequence. This would allow a user to automatically login, for example, to an automated response system when communication is first established. After the user provides information for a PhoneBook entry field, the PhoneBook maintenance module may optionally prompt the user to confirm the input before proceeding on to the next field.

Next, the user provides a name for the current PhoneBook entry at block 106, which is stored in the Name field. The Name field is preferably used as a key for accessing PhoneBook entry tuples in the PhoneBook entries database 78. Therefore, the PhoneBook maintenance module 74 should ensure that the name entered by the user for the new PhoneBook entry is unique. If the current name is not unique, then the PhoneBook maintenance module 74 may deny entry of the current name and prompt the user to enter a different name.

In addition to the Name field, the PhoneBook entries may also be uniquely identified by the contents of the Location field. The Location field is used to provide a sequencing of the PhoneBook entries, which may be used by the PhoneBook maintenance module 74 to display or list the PhoneBook entries on the display 34 in a desired order. The Location field may therefore be updated by the PhoneBook maintenance module 74 as part of an interface for allowing the user to arrange the ordering of PhoneBook entries previously entered. Accordingly, at block 108 the user may optionally enter a desired sequence number for the Location field of the new PhoneBook entry or, alternatively, the PhoneBook maintenance module 74 may automatically assign the next available sequence number to the Location field without input from the user.

The user is prompted at block 112 with the option of associating a voice command with the new PhoneBook entry. If the user declines this option, then the user may be prompted at block 114 to confirm their choice to create a new PhoneBook entry. If a user confirmation is received, then the PhoneBook maintenance module 74 stores the new PhoneBook entry in the PhoneBook entries database 78 at block 114.

If, on the other hand, the user chooses at block 112 to associate a voice command with the new PhoneBook entry, then the PhoneBook maintenance module 74 may communicate with the voice recognition module 84 to activate the VR functionality. At block 116, the user speaks a voice command into the microphone 38 of the mobile terminal 30, which is provided to the VR DSP 56 and interpreted by the voice recognition module 84 to create a voice command label. This voice command label comprises a digital signature for the word(s) spoken by the user. The user may be provided with an audible and/or visual confirmation of the voice command label through the speaker 36 and/or display 34. If a confirmation is received, the voice command label is stored in a Voice Command field and the voice recognition module 84 adds the digital signature for this spoken command to the voice command database 86, which contains a collection of "learned" voice commands. As shown hereinabove in the preferred structure for a PhoneBook entry, a plurality of voice commands may be associated with a single destination. Thus, there may be multiple Voice Command fields in a single PhoneBook entry tuple.

Figure 6B:
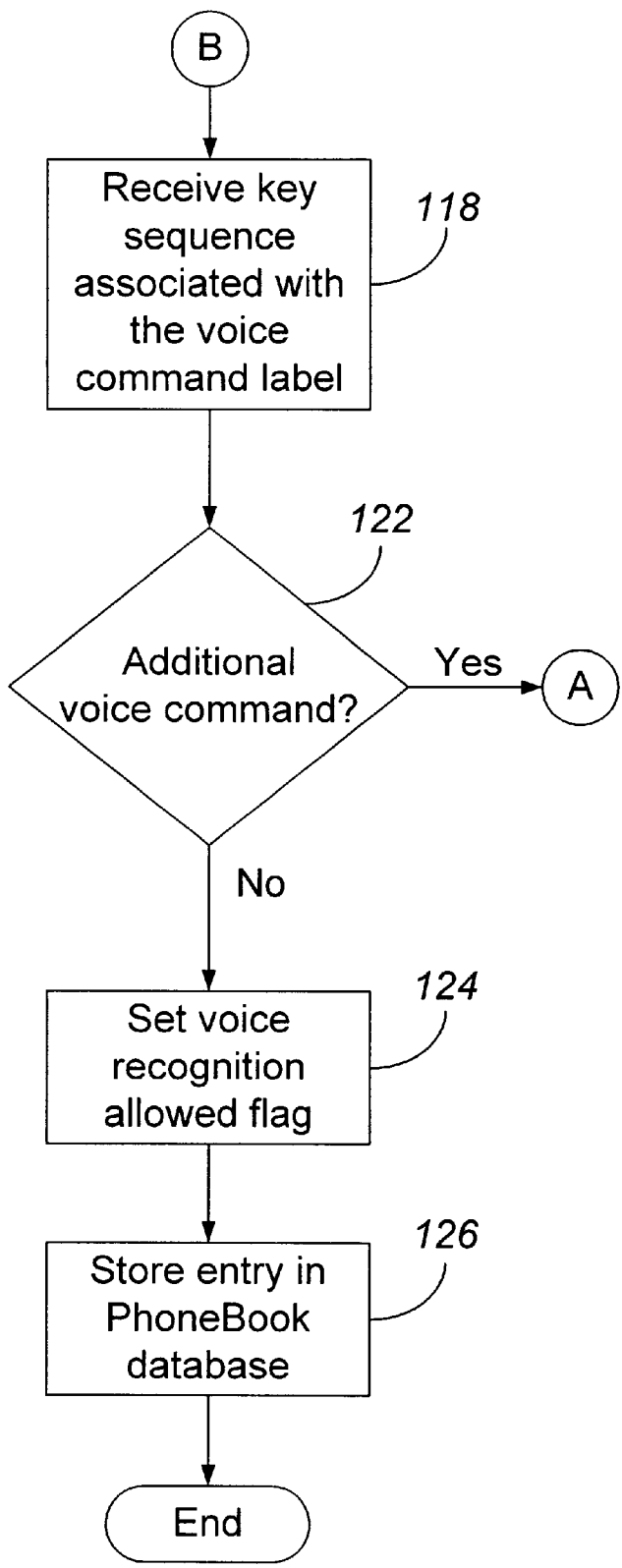
Figure 7A:
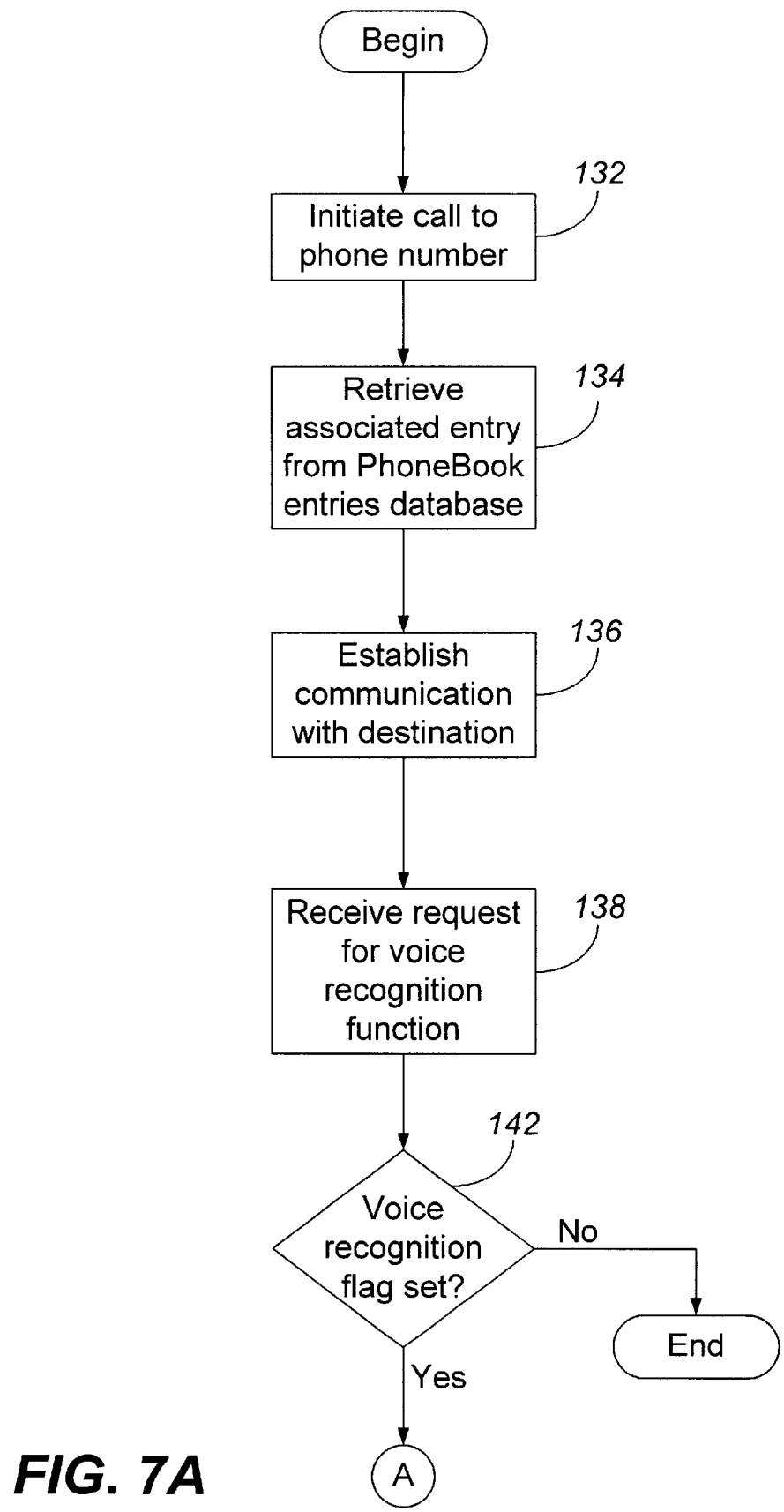
Figure 7B:
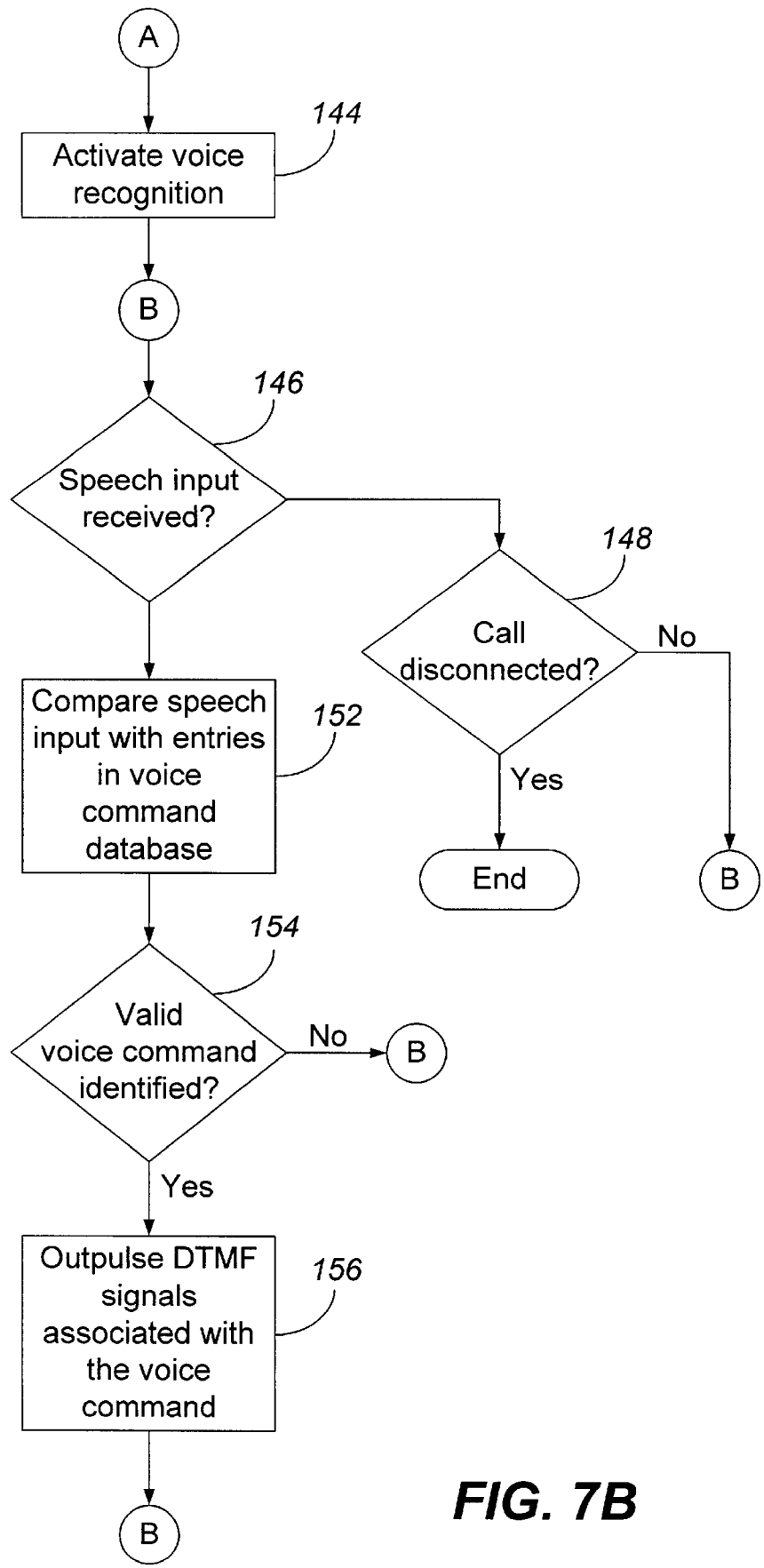

Following connector B to FIG. 6B, the user enters a key sequence at block 118 associated with the previously recorded voice command label. The key sequence is stored in the Keystroke field associated with the Voice Command field containing the voice command label recorded at block 116. Importantly, the key sequence is associated with both a voice command and a destination, which may allow a user to use a spoken command to perform a particular operation on more than destination without regard to the particular keystrokes or signals used to perform the command, even if the keystrokes differ from destination to destination.

The user is then presented with the option at block 122 to associate additional voice commands with the PhoneBook entry. If the user chooses to enter additional voice commands, then connector A is followed to FIG. 6A where the operations continue at block 116 as discussed in the foregoing. If the user declines the option to create additional voice commands as determined at block 122, then the PhoneBook maintenance module 74 sets a voice recognition allowed flag at block 124 for the new PhoneBook entry. The user may then be prompted at block 126 to confirm their choice to create a new PhoneBook entry. If a user confirmation is received, then the PhoneBook maintenance module 74 stores the new PhoneBook entry in the PhoneBook entries database 78 at block 126.

Examples of populated PhoneBook entries are set forth hereafter for purposes of illustration. A user may create a pair of PhoneBook entries corresponding to their voice mail system at work and their voice mail system associated with their mobile service provider as follows:

Example PhoneBook Entry One
Location: 1
Name: Voice Mail Office
Number: 9195551111p##123456
Voice Command 1: SAVE
Keystroke: 7
Voice Command 2: DELETE Keystroke: 3
Voice Command 3: REPLY
Keystroke: 1
Voice Command 4: REPEAT
Keystroke: 2
Voice Command 5: NEXT
Keystroke: 5
Voice Command 6: HELP
Keystroke: 0
Example PhoneBook Entry Two
Location: 2
Name: Voice Mail Mobile
Number: 9195551234p##7654321
Voice Command 1: SAVE
Keystroke: 3
Voice Command 2: DELETE
Keystroke: 2
Voice Command 3: REPEAT
Keystroke: 6
Voice Command 4: NEXT
Keystroke: 7
Voice Command 5: HELP
Keystroke: 0

Note: "p" indicates a pause character.

As will be discussed in more detail hereinafter, when a user makes a call to their voice mail at work, which corresponds to Example PhoneBook Entry One, only those voice commands associated with the "Voice Mail Office" phone book entry are valid. Even though the user's two voice mail systems share common voice commands (i.e., the SAVE, DELETE, REPEAT, NEXT, and HELP voice commands), the keystrokes for carrying out these commands are associated with both a voice command and a specific destination (i.e., Name and Number fields). Accordingly, the present invention may allow the voice-DTMF translation module 76 to schedule the proper keystrokes for transmission that will be recognized by the current destination with which the user is currently connected.

In the two example PhoneBook entries set forth hereinabove, each of the voice commands has a single keystroke associated therewith. Recall from the foregoing discussion with respect to FIG. 1 that some automated response systems may provide information to a user through a hierarchical menu. It may, therefore, be desirable to associate a plurality of keystrokes with a single voice command to perform an operation that is invoked by navigating multiple levels of a hierarchical menu. The following PhoneBook entry defines voice commands for performing various banking operations based on the hierarchical menu of FIG. 1.

Example PhoneBook Entry Three
Location: 3
Name: My Bank
Number: 9195552222p<account number><password>
Voice Command 1: BALANCE
Keystroke: 11
Voice Command 2: ATM DEBITS
Keystroke: 222
Voice Command 3: BACK
Keystroke: *
Voice Command 4: OPERATOR
Keystroke: 0
Voice Command 5: NEXT Referring now to FIGS. 3–5 and 7A–7B, exemplary operations for using PhoneBook entries to transmit a signaling message to a destination (e.g., an automated response system) in response to a spoken command from a user during a stable call or communication session will now be described.

The operations begin at block 132 where a user initiates a call to a phone number having a PhoneBook entry created therefor. At block 134, the voice-DTMF translation module retrieves the entry corresponding to the called destination from the PhoneBook entries database 78 using either the name of the entry as a key or the dialed phone number as the key. For example, a user may initiate the call by using the PhoneBook maintenance module 74 to scroll through the entries in the PhoneBook entries database 78 and then selecting a CALL function once the desired entry is found. The keystrokes stored in the Number field of the PhoneBook entry comprise a signaling message that may be transmitted to establish communication with the destination. In this case, the name associated with the PhoneBook entry may be provided to the voice-DTMF translation module 76, which uses the name as a key to retrieve the tuple for this PhoneBook entry from the PhoneBook entries database 78. Alternatively, if the user dials the destination manually, the dialed phone number may be used by the voice-DTMF translation module 76 as a key to retrieve the tuple for this PhoneBook entry from the PhoneBook entries database 78.

The mobile terminal 30 establishes communication with the destination at block 136 and, at block 138, a request is received from the user to use voice recognition for issuing voice commands. At block 142, the voice-DTMF translation module 76 determines if the voice recognition flag has been set for the PhoneBook entry corresponding to this destination. If the voice recognition flag has not been set, then no voice commands have been recorded for this PhoneBook entry. On the other hand, if the voice recognition flag has been set, then connector A is followed to FIG. 7B where the voice-DTMF translation module 76 communicates with the voice recognition module 84 at block 144 to activate VR functionality.

At block 146 the voice-DTMF translation module 76 awaits speech input from the user. If no speech input is received, the communication session with the destination may be disconnected as represented by block 148. Otherwise, when the user speaks a command into the microphone 38, the speech input is provided to the VR DSP 56 where it is interpreted by the voice recognition module 84 to generate a digital signature therefor at block 152. In particular, the voice recognition module 84 compares the digital signature generated for the speech input with digital signatures stored in the voice command database 86. The voice recognition module 84 communicates with the voice-DTMF translation module 76 to provide the voice-DTMF translation module 76 with the voice command label corresponding to the present speech input if a match is detected and a "no-match" message if a match is not detected.

The voice-DTMF translation module 76 determines at block 154 whether the user has issued a valid voice command. More specifically, if the voice-DTMF translation module 76 receives a voice command label from the voice recognition module 84, then the voice-DTMF translation module 76 compares this voice command label with the labels stored in the Voice Command fields for the PhoneBook entry tuple retrieved at block 134. If the voice command label does not match any of the voice command labels associated with the current destination, then the speech input is ignored and the process continues at block 146 where the voice-DTMF translation module 76 awaits additional speech input. The foregoing may be illustrated with reference to the Example PhoneBook Entries One and Two discussed hereinbefore. If a user made a call to their voice mail system associated with their mobile phone (Example PhoneBook Entry Two) and spoke the command "REPLY," the voice recognition module 84 would recognize this speech input because a digital signature has been stored for this command in the voice command database 86 when "REPLY" was added as a voice command for the office voice mail PhoneBook entry (Example PhoneBook entry one). Nevertheless, the command "REPLY" has not been added as a voice command for the PhoneBook entry associated with the mobile phone voice mail system; therefore, the user's attempt to perform a reply operation using a spoken command will be unsuccessful.

Likewise, if the voice recognition module 84 returns a "no-match" message to the voice-DTMF translation module 76, the speech input is ignored and the process continues at block 146 where the voice-DTMF translation module 76 awaits additional speech input.

If, however, the voice-DTMF translation module 76 determines at block 154 that the user has issued a valid voice command for this destination (i.e., the voice command label received from the voice recognition module 84 matches one of the labels stored in the Voice Command fields of the PhoneBook entry tuple retrieved at block 134), then the voice-DTMF translation module 76 initiates transmission or outpulsing of the keystrokes that are associated with this voice command and with this destination at block 156. More specifically, the voice-DTMF translation module 76 retrieves the key sequence stored in the Keystroke field associated with the valid voice command. This key sequence comprises a signaling message that is communicated to the DTMF outpulsing module 92. Using the tone database 94 to associate DTMF tones with the keystroke(s) comprising the signaling message, the DTMF outpulsing module transmits either DTMF tones, if the communication channel is analog, or DTMP signaling messages, if the communication channel is digital, to the destination to cause the user requested operation or function to be performed. Once transmission is complete, the process continues at block 146 where the voice-DTMF translation module 76 awaits additional speech input.

It will be appreciated that the present invention is not limited to DTMF signaling as the principles and concepts disclosed herein are equally applicable to other signaling standards and protocols. DTMF signaling is used in a preferred embodiment of the present invention because of its pervasive use in the PSTN and in automated response systems.

The flow charts of FIGS. 6A–6B and 7A–7B show the architecture, functionality, and operation of an exemplary implementation of the mobile terminal 30 software. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 6A–6B and 7A–7B. For example, two blocks shown in succession in FIGS. 6A–6B and 7A –7B may be executed substantially concurrently or the blocks may sometimes be executed in the reverse order, depending upon the functionality involved.

The principles of the present invention have been illustrated in the context of using VR technology to invoke the transmission of DTMF signals during a stable call. In particular, the present invention makes use of VR functionality and DTMF signaling to allow a user to associate DTMF signaling messages with both a spoken voice command and a specific destination, such as an automated response system. As a result, a user may be relieved of the burden of having to remember keystroke sequences for performing common operations on one or more destinations. Moreover, the use of VR technology may provide a measure of safety in that a user need not direct their attention to the communication device to perform a desired operation or function.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

I claim:

1. A communication device, comprising:
   means for associating a voice command with a destination communication device;
   means for associating a first signaling message with the voice command and the destination communication device;
   means for establishing communication with the destination communication device;
   means for receiving speech input corresponding to the voice command that is responsive to the means for establishing; and
   means for transmitting the first signaling message to the destination communication device that is responsive to the speech input corresponding to the voice command.

2. The communication device as recited in claim 1, further comprising:
   means for defining a second signaling message for accessing the destination communication device; and wherein the means for establishing comprises:
   means for transmitting the second signaling message.

3. The communication device as recited in claim 2, further comprising:
   means for associating a name with the second signaling message.

4. The communication device as recited in claim 2, wherein the second signaling message is a dual tone multi-frequency (DTMF) signal.

5. The communication device as recited in claim 2, wherein the second signaling message is a plurality of dual tone multi-frequency (DTMF) signals.

6. The communication device as recited in claim 2, wherein the means for associating a voice command with the destination communication device comprises:
   means for recording a voice command label; and
   wherein the means for associating the first signaling message with the voice command and the destination communication device comprises:
   means for receiving the first signaling message; and
   means for associating the first signaling message with the voice command label and the destination communication device.

7. The communication device as recited in claim 6, wherein the means for receiving speech input corresponding to the voice command comprises:
   means for interpreting the speech input; and
   means for comparing the interpreted speech Input with the voice command label.

8. The communication device as recited in claim 2, further comprising:
   means for setting a voice recognition flag that indicates voice recognition is allowed for the destination communication device that is responsive to the means for associating the voice command with the destination communication device and the means for associating the first signaling message with the voice command and the destination communication device.

9. The communication device as recited in claim 8, further comprising:
   means for receiving a request for voice recognition; and
   means for activating voice recognition that is responsive to the means for setting the voice recognition flag.

10. The communication device as recited in claim 1, wherein the first signaling message is a dual tone multi-frequency (DTMF) signal.

11. The communication device as recited in claim 1, wherein the first signaling message is a plurality of dual tone multi-frequency (DTMF) signals.

12. The communication device as recited in claim 1, wherein the means for associating the voice command with the destination communication device comprises:
   means for associating a plurality of voice commands with the destination communication device.

13. The communication device as recited in claim 12, wherein the means for associating the first signaling message with the voice command and the destination communication device comprises:
   means for associating a plurality of signaling messages with the plurality of voice commands, respectively, and with the destination communication device.

14. The communication device as recited in claim 13, wherein each of the plurality of signaling messages comprises a dual tone multi-frequency (DTMF) signal.

15. The communication device as recited in claim 13, wherein at least one of the plurality of signaling messages comprises a plurality of dual tone multi-frequency (DTMF) signals.

16. A communication device, comprising:
   means for establishing communication with a destination communication device, and
   means for transmitting a predefined signaling message that is associated with both a voice command and the destination communication device and is responsive to the means for establishing communication.

17. The communication device as recited in claim 16, further comprising:
   means for receiving speech input corresponding to the voice command; and
   wherein the means for transmitting a predefined signaling message is responsive to the means for establishing communication and the means for receiving speech input.

18. The communication device as recited in claim 16, wherein the predefined signaling message is a dual tone multi-frequency (DTMF) signal.

19. The communication device as recited in claim 16, wherein the predefined signaling message is a plurality of dual tone multi-frequency (DTMF) signals.

20. A communication device, comprising:
   a circuit that establishes communication with a destination communication device; and
   a processor that transmits a predefined signaling message that is associated with both a voice command and the destination communication device and is responsive to the circuit.

21. The communication device as recited in claim 20, wherein the predefined signaling message is a dual tone multi-frequency (DTMF) signal.

22. The communication device as recited in claim 20, wherein the predefined signaling message is a plurality of dual tone multi-frequency (DTMF) signals.

23. A method of transmitting information from a communication device to a destination communication device, comprising the steps of:
   associating a voice command with the destination communication device;
   associating a first signaling message with the voice command and the destination communication device;
   establishing communication with the destination communication device;
   receiving, responsive to the establishing step, speech input corresponding to the voice command; and
   transmitting, responsive to the receiving step, the first signaling message to the destination communication device.

24. The method as recited in claim 23, further comprising the step of:
   defining a second signaling message for accessing the destination communication device; and wherein the establishing step further comprises the step of:
   transmitting the second signaling message.

25. The method as recited in claim 24, further comprising the step of:
   setting, responsive to the associating the voice command and associating the first signaling message steps, a voice recognition flag that indicates voice recognition is allowed for the destination communication device.

26. The method as recited in claim 25, further comprising the steps of:
   receiving a request for voice recognition; and
   activating voice recognition if the voice recognition flag has been set.

27. The method as recited in claim 24, further comprising the step of:
   associating a name with the second signaling message.

28. The method as recited in claim 24, wherein the second signaling message is a dual tone multi-frequency (DTMF) signal.

29. The method as recited in claim 24, wherein the second signaling message is a plurality of dual tone multi-frequency (DTMF) signals.

30. The method as recited in claim 24, wherein the associating the voice command with the destination communication device step comprises the steps of:
   recording a voice command label; and
   wherein the associating the first signaling message step comprises the steps of:
   receiving the first signaling message; and
   associating the first signaling message with the voice command label and the destination communication device.

31. The method as recited in claim 30, wherein the receiving speech input step comprises the steps of:
   interpreting the speech input; and
   comparing the interpreted speech input with the voice command label.

32. The method as recited in claim 23, wherein the first signaling message is a dual tone multi-frequency (DTMF) signal.

33. The method as recited in claim 23, wherein the first signaling message is a plurality of dual tone multi-frequency (DTMF) signals.

34. The method as recited in claim 23, wherein the associating the voice command step comprises the step of:
associating a plurality of voice commands with the destination communication device.

35. The method as recited in claim 34, wherein the associating the first signaling message step comprises the step of:
associating a plurality of signaling messages with the plurality of voice commands, respectively, and with the destination communication device.

36. The method as recited in claim 35, wherein each of the plurality of signaling messages comprises a dual tone multi-frequency (DTMF) signal.

37. The method as recited in claim 35, wherein at least one of the plurality of signaling messages comprises a plurality of dual tone multi-frequency (DTMF) signals.

38. A method of transmitting information from a communication device to a destination communication device, comprising the steps of:
establishing communication with the destination communication device; and
transmitting, responsive to the establishing step, a predefined signaling message that is associated with both a voice command and the destination communication device.

39. The method as recited in claim 38, further comprising the step of:
receiving, responsive to the establishing step, speech input corresponding to the voice command, the transmitting step being responsive to the establishing step and the receiving step.

40. The method as recited in claim 38, wherein the predefined signaling message is a dual tone multi-frequency (DTMF) signal.

41. The method as recited in claim 38, wherein the predefined signaling message is a plurality of dual tone multi-frequency (DTMF) signals.

42. A computer program product for transmitting information from a communication device to a destination communication device, comprising:
a computer readable storage medium having computer readable program code embodied therein, the computer readable program code comprising:
computer readable program code that associates a voice command with the destination communication device;
computer readable program code that associates a first signaling message with the voice command and the destination communication device;
computer readable program code that establishes communication with the destination communication device;
computer readable program code that receives speech input corresponding to the voice command and is responsive to the computer readable program code that establishes communication with the destination communication device; and
computer readable program code that transmits the first signaling message to the destination communication device and is responsive to the speech input corresponding to the voice command.

43. The computer program product as recited in claim 42, further comprising:
computer readable program code that defines a second signaling message for accessing the destination communication device; and wherein the computer readable program code that establishes communication with the destination communication device comprises:
computer readable program code that transmits the second signaling message.

44. The computer program product as recited in claim 43, further comprising:
computer readable program code that associates a name with the second signaling message.

45. The computer program product as recited in claim 43, wherein the second signaling message is a dual tone multi-frequency (DTMF) signal.

46. The computer program product as recited in claim 43, wherein the second signaling message is a plurality of dual tone multi-frequency (DTMF) signals.

47. The computer program product as recited in claim 43, wherein the computer readable program code that associates the voice command with the destination communication device comprises:
computer readable program code that records a voice command label; and wherein the computer readable program code that associates the first signaling message with the voice command and the destination communication device comprises:
computer readable program code that receives the first signaling message; and
computer readable program code that associates the first signaling message with the voice command label and the destination communication device.

48. The computer program product as recited in claim 47, wherein the computer readable program code that receives speech input corresponding to the voice command comprises:
computer readable program code that interprets the speech input; and
computer readable program code that compares the speech input with the voice command label.

49. The computer program product as recited in claim 43, further comprising:
computer readable program code that sets a voice recognition flag that indicates voice recognition is allowed for the destination communication device and is responsive to the computer readable program code that associates the voice command with the destination communication device and the computer readable program code that associates the first signaling message with the voice command and the destination communication device.

50. The computer program product as recited in claim 49, further comprising:
computer readable program code that receives a request for voice recognition; and
computer readable program code that activates voice recognition that is responsive to the computer readable program code that sets the voice recognition flag.

51. The computer program product as recited in claim 42, wherein the first signaling message is a dual tone multi-frequency (DTMF) signal.

52. The computer program product as recited in claim 42, wherein the first signaling message is a plurality of dual tone multi-frequency (DTMF) signals.

53. The computer program product as recited in claim 42, wherein the computer readable program code that associates the voice command with the destination communication device comprises:

computer readable program code that associates a plurality of voice commands with the destination communication device.

54. The computer program product as recited in claim 53, wherein the computer readable program code that associates the first signaling message with the voice command and the destination communication device comprises:

computer readable program code that associates a plurality of signaling messages with the plurality of voice commands, respectively, and with the destination communication device.

55. The computer program product as recited in claim 54, wherein each of the plurality of signaling messages comprises a dual tone multi-frequency (DTMF) signal.

56. The computer program product as recited in claim 54, wherein at least one of the plurality of signaling messages comprises a plurality of dual tone multi-frequency (DTMF) signals.

57. A computer program product for transmitting information from a communication device to a destination communication device, comprising:

a computer readable storage medium having computer readable program code embodied therein, the computer readable program code comprising:
computer readable program code that establishes communication with the destination communication device; and
computer readable program code that transmits a predefined signaling message that is associated with both a voice command and the destination communication device and is responsive to the computer readable program code that establishes communication.

58. The computer program product as recited in claim 57, further comprising:

computer readable program code that receives speech input corresponding to the voice command; and
wherein the computer readable program code that transmits a predefined signaling message is responsive to the computer readable program code that establishes communication and the computer readable program code that receives speech input.

59. The computer program product as recited in claim 57, wherein the predefined signaling message is a dual tone multi-frequency (DTMF) signal.

60. The computer program product as recited in claim 57, wherein the predefined signaling message is a plurality of dual tone multi-frequency (DTMF) signals.

61. A method of transmitting information from a communication device to a destination communication device, comprising the steps of:

associating a voice command with a plurality of destination communication devices; and
associating a first signaling message with the voice command and one of the plurality of destination communication devices.

62. The method as recited in claim 61, further comprising the steps of:

establishing communication with the one of the plurality of destination communication devices;
receiving speech input corresponding to the voice command; and
transmitting, responsive to the receiving step, the first signaling message to the one of the plurality of destination communication devices.

63. A method of transmitting information from a communication device to a destination communication device, comprising the steps of:

associating a voice command with a destination communication device; and
associating a first signaling message with the voice command and the destination communication device.

64. The method as recited in claim 63, further comprising the steps of:

establishing communication with the destination communication device;
receiving speech input corresponding to the voice command; and
transmitting, responsive to the receiving step, the first signaling message to the destination communication device.

* * * * *